Patented Oct. 5, 1943

2,331,090

UNITED STATES PATENT OFFICE 2,331,090

CELLULOSE ETHER COMPOSITION

Arnold R. Gabel and Fred Lowell Taylor, Midland, Mich., assignors to The Dow Chemical Company, Midland, Mich., a corporation of Michigan No Drawing. Application February 24, 1941, Serial No. 380,304

13 Claims. (Cl. 106—188)

This invention relates to cellulose derivative compositions, and particularly to compositions wherein the cellulose derivative is plasticized with certain β-aryloxy, β'-chloro dialkyl ethers.

In preparing a plasticized cellulose derivative composition, it is ordinarily the object to provide a composition which is more flexible than the original unplasticized cellulose derivative. Flexibility, however, is not the only desirable attribute of a cellulose derivative composition and the selection of a plasticizer which will modify various other properties of the said cellulose derivative requires considerable care and experimentation. Among the properties of the cellulose derivatives which it may be desirable to modify are those of moisture permeability, which should ordinarily be reduced; flexibility, which should be increased; tensile strength, which should not be decreased materially, and, if possible, should be increased; and, for certain purposes, the flammability characteristics and dielectric properties should each be modified so as to make the cellulose derivative substantially non-flammable under the conditions of its use and convert it to a product satisfactory for use as an electrical insulating medium.

Numerous plasticizers are known which soften cellulose derivatives sufficiently so that they may be employed in the form of flexible foil, sheets, or tape, as wrapping material, or the like. Compositions comprising such of the customary plasticizers, for example, as dibutyl phthalate or tricresyl phosphate, are ordinarily not materially better than the cellulose derivative alone as regards moisture permeability, flammability, or dielectric properties. Hence, such compositions cannot be employed satisfactorily as electrical insulating media around wires, cables, and the like, where moisture permeability and flammability of the insulating composition are as important as the flexibility and dielectric properties.

It must be remembered that the hardness, toughness, and extensibility desired in cellulose derivative compositions is largely determined by the use to which such compositions may be put. Plastics for injection molding must flow well at molding temperatures but should harden rapidly at lower temperatures. They should be hard enough when cold to withstand scratching, and tough enough to withstand shock. Plastics for extrusion coating of wire, for example, must flow well, have high flexibility at all temperatures met with in service, and be sufficiently hard and tough to withstand abrasion. In addition, the composition must provide good electrical insulation. Similarly, lacquer coatings must be hard, tough, and possess elastic extensibility to prevent cracking. In addition, retention of flexibility on exposure to light and heat is desirable. Fabric coatings should be flexible, hard, glossy, and free from tackiness and be resistant to discoloration by alkalies and detergents.

It is, accordingly, an object of the present invention to provide cellulose derivative compositions comprising plasticizers which will improve the flexibility, reduce the moisture permeability, suppress or overcome the tendency of the cellulose derivative toward flammability and improve the dielectric properties. Other objects of the invention and advantages accruing thereto will become apparent as the description proceeds.

The cellulose derivatives with which the invention is concerned are those which are soluble in organic solvents and which, at least when plasticized, are capable of being molded or extruded to form useful shaped articles. Such cellulose derivatives, by virtue of their solubility in organic solvents, will herein be referred to as "organo-soluble" cellulose derivatives. The invention is primarily concerned with cellulose ethers, both alkyl and aralkyl, which are soluble in organic solvents. The cellulose ethers which are employed, according to the hereinafter described invention, are those containing from about 2.0 to about 2.75 or more substituent groups per anhydro-glucose unit. Examples of such ethers are the organo-soluble ethyl, propyl, butyl, lauryl, and benzyl ethers of cellulose and mixed ethers comprising a plurality of these or similar substituent groups.

It has now been found that the foregoing and related objects may be attained by incorporating in an organo-soluble cellulose derivative plasticizing quantities, usually from about 5 to about 100 parts by weight for each 100 parts of the cellulose derivative, of a di- or tri-substituted β-aryloxy, β-chloro diethyl ether having the general formula

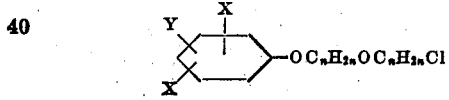

wherein one X represents a substituent from the group consisting of the phenyl and alkyl radicals and chlorine; the other X represents a substituent from the group consisting of the aralkyl and tertiary alkyl radicals, and chlorine; Y represents a member of the group consisting of aralkyl radicals, chlorine and hydrogens; and $n$ is one of the integers 2 and 3. The alkyl radicals falling within the definition of X are those of not to exceed 8 carbon atoms, and may be of normal, secondary, iso, or tertiary configuration. The substituents X are most commonly found in an ortho-positions relative to the oxygen atom, and the Y substituent is most commonly in the 4- or para-position, though each may occur in other of the five available positions on the benzene ring. Thus, either X may occur in a meta-position, and Y may occur in either an ortho- or a meta-position, relative to the oxygen atom.

Some of the compounds herein employed as plasticizers form the basis for the claims in co-pending applications, Serial No. 371,143 filed December 21, 1940, now issued as Patent No. 2,297,728 of October 6, 1942, and Serial No. 371,404, filed December 23, 1940, both by one of the present inventors and another. Others of the present plasticizer compounds are claimed as new compounds in issued U. S. patents, among which are Nos. 2,205,392 and 2,205,393.

The new plasticizers, above-defined, all have boiling points above 200° C. at 10 mm. mercury, absolute pressure. By way of contrast, β-phenoxy, β'-chloro diethyl ether, wherein the phenyl nucleus is unsubstituted, boils at about 165°–170° C. at 20 mm. and is too volatile for use as a cellulose derivative plasticizer, where the plastic is to be extruded or molded.

The new plasticizers, while effective with all the organo-soluble cellulose derivatives, exhibit particularly advantageous properties when employed in cellulose ether compositions, such as those of ethyl cellulose, and especially in ethyl cellulose compositions for molding or extrusion purposes.

Among the specific plasticizers falling within the foregoing definition which have been used with advantage in ethyl cellulose compositions are those listed in Table 1, which will, for convenience, be designated hereinafter by the numbers appearing in the left-hand column of the table.

TABLE 1

| No. | Name |
|---|---|
| 1 | β-(2-phenyl,4-α-phenylethyl,6-chloro)-phenoxy,β'-chloro diethyl ether |
| 2 | β-[2-phenyl,4-(o-,p-dichloro α-phenylethyl)]-phenoxy, β'-chloro diethyl ether |
| 3 | β-(2-phenyl, monochloro)-phenoxy, β'-chloro diethyl ether |
| 4 | β-(2-phenyl, 4-α-phenylethyl)-phenoxy, β'-chloro diethyl ether |
| 5 | β-(2-phenyl,4,6-di-α-phenylethyl)-phenoxy,β'-chloro diethyl ether |
| 6 | β-(di-α-phenylethyl, mono-methyl)-phenoxy, β'-chloro diethyl ether |
| 7 | β-(2,4-di-α-phenylethyl)-phenoxy, β'-chloro diethyl ether |
| 8 | β-(2,6-di-α-phenylethyl,4-tertiary butyl)-phenoxy, β'-chloro diethyl ether |
| 9 | β-(2,4,6-tri-α-phenylethyl)-phenoxy, β'-chloro diethyl ether |
| 10 | β-(o-, p-dichloro-α-phenylethyl)-phenoxy, β'-chloro diethyl ether |
| 11 | β-(α-phenylethyl)-phenoxy, β'-chloro diethyl ether |
| 12 | β-[2-methoxy, mono-(p-chloro-α-phenylethyl)]-phenoxy, β'-chloro diethyl ether |
| 13 | β-(2,4-dibenzyl)-phenoxy, β'-chloro diethyl ether |
| 14 | β-(2-phenyl, 4-benzyl)-phenoxy, β'-chloro diethyl ether |
| 15 | β-(2-chloro, 4-tertiary butyl)-phenoxy, β'-chloro diethyl ether |
| 16 | β-(2,4-dichloro)-phenoxy, β'-chloro diethyl ether |

The plasticizers of the present invention, in general, may be made by interacting, in an alkaline medium, a dichloro-alkyl ether, such as β,β'-dichloro diethyl ether, or β,β'-dichloro-di-isopropyl ether, and suitably substituted phenols. Alternatively, they may be made by further substitution in the phenyl nucleus of such simpler compounds as β-phenoxy, β'-chloro diethyl ether. Other modes of preparation will be apparent to a skilled chemist.

Plasticizing properties of several of the above-listed compounds, as far as they can be indicated by yield, tensile, and elongation values of ethyl cellulose films containing the plasticizer are given in the following Table 2. The tensile, yield, elongation and hardness index values reported in Table 2 were determined as described by Bass and Kauppi, Industrial and Engineering Chemistry, 29, 678–686 (1937).

TABLE 2

*Film properties*

| Plasticizer No. | 13% plasticizer in film | | | 29% plasticizer in film | | | 13% hardness index |
|---|---|---|---|---|---|---|---|
| | Yield pt. | Tensile strength | Elongation | Yield pt. | Tensile strength | Elongation | |
| | $Kg./cm.^2$ | $Kg./cm.^2$ | Per cent | $Kg./cm.^2$ | $Kg./cm.^2$ | Per cent | Per cent |
| 1 | 375 | 445 | 22 | 200 | 350 | 43 | 79 |
| 2 | 395 | 530 | 30 | 260 | 400 | 34 | 83 |
| 3 | 345 | 460 | 28 | 95 | 215 | 54 | 72 |
| 4 | 335 | 505 | 34 | 155 | 310 | 48 | 70 |
| 5 | 465 | 530 | 23 | 295 | 410 | 32 | 98 |
| 6 | 430 | 505 | 25 | 195 | 330 | 43 | 90 |
| 7 | 370 | 450 | 25 | 155 | 270 | 44 | 78 |
| 8 | 430 | 565 | 30 | 255 | 375 | 36 | 90 |
| Tricresyl phosphate (for comparison) | | | | | | | 50 |
| Blank | 475 | 630 | 30 | | | | 100 |

The following examples illustrate the present invention.

EXAMPLE 1.—*Composition for use as extruded cable coatings*

The plasticizers of the present invention, when employed in ethyl cellulose compositions, provide cable coatings of exceptional value. Noteworthy among the properties of the cable coatings are their dielectric strength after long immersion in water, as compared with those of the usual ethyl cellulose coatings, and their cold flexibility. The following typical compositions are among those used as cable coatings in the comparative tests to be described below:

| Formulation | A | B | C |
|---|---|---|---|
| Ethyl cellulose (48.5% ethoxy) | 55 | 68 | 65 |
| Plasticizer No. 4 (from Table 1) | 15 | 30 | 20 |
| Polychloro diphenyl ("Aroclor 1262") | 18 | | |
| Monophenyl di-o-xenyl phosphate | 10 | | 15 |
| Maleic-glycerol-rosin alkyd | 2 | 2 | |
| | 100 | 100 | 100 |

Extrusion plastics of the above three formulations were made by first adding the plasticizers and a pigment to a quantity of 67:33 benzene-methanol. The ethyl cellulose was added, and mixing was carried out for an hour in a suitable mill. The solvent colloided mixture was then cold-rolled into a sheet, cut into strips, and dried at 60° C. The strips were ground to provide a fine feed for an extrusion press. Two commercially available ethyl cellulose cable coating compositions were employed in the comparative tests listed below. Because of their pigmentation, these will be designated simply as "Red" and "Yellow."

Cold flexibility was determined by first allowing the extrusion coated wire to remain in a refrigerator at —5° C. for 16 hours, then quickly kinking the wire. If no fracture occurred, the coating was passed as being satisfactory.

Dielectric strength of the coating was determined in standard manner on samples which had been aged in an air atmosphere at 50 per cent relative humidity, as well as on samples which had been submerged in water at room temperature for 24 hours and for 7 days.

TABLE 3

| Formulation | Cold flexibility | Dielectric strength, volts/mil | | |
|---|---|---|---|---|
| | | 50% rel. humidity | 24 hours under water | 7 days under water |
| Commercial "Red" | Failed | 1,430 | 400 | 350 |
| Commercial "Yellow" | do | 1,350 | 300 | 200 |
| A | No breaks | 1,985 | 650 | 550 |
| B | do | 1,920 | 850 | 830 |
| C | Cracked once in 5 kinks | 1,760 | 1,230 | 950 |

In addition to the tests reported in the table, measurements were made on the various coated wire samples to determine the amount of longitudinal pull required to strip the coating from the wire. In most cases the wire broke before any stripping occurred, and in all other cases, stripping occurred under a load only about 5 per cent less than the breaking load.

The best indications of the quality of an extrusion wire coating are given by the tests for cold flexibility and resistance to water. Absorption of water into the coating causes a reduction of dielectric strength. Table 3 indicates that ethyl cellulose compositions containing plasticizer No. 4 are superior in cold flexibility and in water resistance to commercially accepted ethyl cellulose coatings containing only other types of plasticizers. Tests have shown that all the compounds listed in Table 1, as well as others of the numerous compounds defined by the general formula hereinbefore given, provide useful ethyl cellulose cable coating compositions for application to wire by extrusion methods.

EXAMPLE 2.—*Compositions for use as molding plastics*

A series of compositions were made consisting solely of ethyl cellulose and various amounts of one of the herein-concerned plasticizers. The compositions were molded under 7 tons pressure at 160° C., using a mold which formed simultaneously several pieces of different shapes suitable for carrying out the various standard tests on molded plastics. The ethyl cellulose used was of 45.3 per cent ethoxy content, and was of a type whose 5 per cent solution in 70:30 toluene-ethanol has a viscosity of 57 centipoises. Typical results are those given in Table 4, showing compositions containing plasticizer No. 8. For comparison, similar tests were made on compositions of ethyl cellulose and triphenyl phosphate (TPP).

TABLE 4

| Plasticizer | | Tensile strength | Elongation | Weld strength | Rockwell hardness 15Y | Heat distortion | Temperature required to flow 1 inch in 120 seconds |
|---|---|---|---|---|---|---|---|
| No. | Per cent | | | | | | |
| | | #/in.² | Per cent | #/in.² | | °C. | |
| 8 | 20 | 6,030 | 11.4 | 65 | 87 | 79 | 142 |
| 8 | 17 | 7,200 | 9.4 | 69 | 89 | 82.5 | 146 |
| 8 | 15 | 5,940 | 8.2 | 56 | 80 | 84 | 138 |
| TPP | 20 | 3,900 | 6 | 36 | 67 | 69 | 121 |

It is clear that the moldings made from the new compositions are superior in each of the properties reported to similar moldings from the customary type of plasticized ethyl cellulose compositions. The Table 4 shows but one of the new plasticizers, which, however, is typical of the group claimed as a whole.

EXAMPLE 3.—*Lacquer compositions*.

The new compositions may be employed in typical lacquer formulations to deposit durable, tough and flexible coatings which are resistant to cold checking and are adherent to a variety of surfaces, including wood, paper, and some metals. Typical of such lacquers which have been found of advantage is a mixture of the following "solids" dissolved in any suitable lacquer vehicle such as toluene, ethanol, xylene, naphtha mixtures:

Solids:
  Ethyl cellulose, 48 per cent ethoxy 10
    centipoise type_____ 40
  Plasticizer No. 1 (from Table 1)_____ 25
  Oil soluble, oil reactive, pure phenolic
    resin (such as Superbeckacite 1001)___ 35

The invention has been described with particular reference to ethyl cellulose compositions and certain specific ones of the plasticizers covered by the general formula. Other cellulose ethers of the organo-soluble type may be as advantageously plasticized with the new agents. Such ethers include, among others, the propyl and butyl celluloses, methyl ethyl cellulose, ethyl butyl cellulose, ethyl lauryl cellulose, methyl benzyl cellulose, benzyl cellulose, and like alkyl and aralkyl (or mixed) cellulose ethers. The amount of plasticizer, as previously indicated, will be governed somewhat by the intended use of the composition, and may vary from as little as 5 parts per 100 parts of the cellulose ethers to 100 or more parts of plasticizer per 100 parts of cellulose ether. For moldings and extrusion coatings, and like compositions, there is usually employed from about 10 to about 40 parts of plasticizer per 100 parts of the cellulose ether.

We claim:
1. A composition of matter comprising an organo-soluble cellulose derivative plasticized with a β-aryloxy, β'-chloro dialkyl ether having the general formula

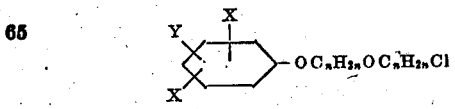

wherein one X represents a substituent from the group consisting of the phenyl radical, alkyl radicals containing from 1 to 8 carbon atoms, and chlorine; the other X represents a substituent from the group consisting of the aralkyl and tertiary alkyl radicals and chlorine; Y represents a member of the group consisting of the aralkyl radicals and hydrogen; and $n$ is one of the integers 2 and 3.

2. A composition of matter comprising an organo-soluble cellulose ether plasticized with a $\beta$-aryloxy, $\beta'$-chloro dialkyl ether having a general formula

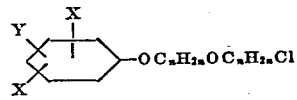

wherein one X represents a substituent from the group consisting of the phenyl radical, alkyl radicals containing from 1 to 8 carbon atoms, and chlorine; the other X represents a substituent from the group consisting of the aralkyl and tertiary alkyl radicals and chlorine; Y represents a member of the group consisting of the aralkyl radicals and hydrogen; and $n$ is one of the integers 2 and 3.

3. A composition of matter comprising an organo-soluble cellulose ether plasticized with a $\beta$-aryloxy, $\beta'$-chloro dialkyl ether having the general formula

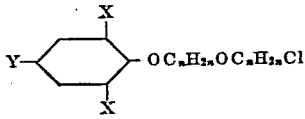

wherein one X represents a substituent from the group consisting of the phenyl radical, alkyl radicals containing from 1 to 8 carbon atoms, and chlorine; the other X represents a substituent from the group consisting of the aralkyl and tertiary alkyl radicals and chlorine; Y represents a member of the group consisting of the aralkyl radicals and hydrogen; and $n$ is one of the integers 2 and 3.

4. A composition of matter comprising an organo-soluble cellulose alkyl ether plasticized with a $\beta$-aryloxy, $\beta'$-chloro dialkyl ether having the general formula

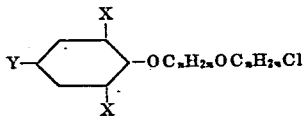

wherein one X represents a substituent from the group consisting of the phenyl radical, alkyl radicals containing from 1 to 8 carbon atoms, and chlorine; the other X represents a substituent from the group consisting of the aralkyl and tertiary alkyl radicals and chlorine; Y represents a member of the group consisting of the aralkyl radicals and hydrogen; and $n$ is one of the integers 2 and 3.

5. A composition of matter comprising an organo-soluble ethyl cellulose plasticized with a $\beta$-aryloxy, $\beta'$-chloro dialkyl ether having the general formula

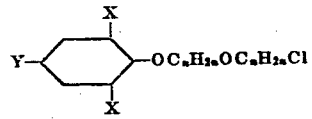

wherein one X represents a substituent from the group consisting of the phenyl radical, alkyl radicals containing from 1 to 8 carbon atoms, and chlorine; the other X represents a substituent from the group consisting of the aralkyl and tertiary alkyl radicals and chlorine; Y represents a member of the group consisting of the aralkyl radicals and hydrogen; and $n$ is one of the integers 2 and 3.

6. A composition of matter comprising an organo-soluble cellulose alkyl ether and plasticizing quantities of $\beta$-(2-phenyl, 4-$\alpha$-phenylethyl, 6-chloro)-phenoxy, $\beta'$-chloro diethyl ether.

7. A composition of matter comprising an organo-soluble cellulose alkyl ether and plasticizing quantities of $\beta$-(2-phenyl, 4-$\alpha$-phenylethyl)-phenoxy, $\beta'$-chloro diethyl ether.

8. A composition of matter comprising an organo-soluble cellulose alkyl ether and plasticizing quantities of $\beta$-(2.6-di-$\alpha$-phenylethyl, 4-tertiary butyl)-phenoxy, $\beta'$-chloro diethyl ether.

9. A composition of matter comprising an organo-soluble ethyl cellulose and plasticizing quantities of $\beta$-(2-phenyl, 4-$\alpha$-phenylethyl, 6-chloro)-phenoxy, $\beta'$-chloro diethyl ether.

10. A composition of matter comprising an organo-soluble ethyl cellulose and plasticizing quantities of $\beta$-(2-phenyl, 4-$\alpha$-phenylethyl)-phenoxy, $\beta'$-chloro diethyl ether.

11. A composition of matter comprising an organo-soluble ethyl cellulose and plasticizing quantities of $\beta$-(2.6-di-$\alpha$-phenylethyl, 4-tertiary butyl)-phenoxy, $\beta'$-chloro diethyl ether.

12. A composition of matter comprising an organo-soluble ethyl cellulose plasticized with from 5 to 100 parts, per 100 parts of ethyl cellulose, of a $\beta$-aryloxy, $\beta'$-chloro dialkyl ether having the general formula

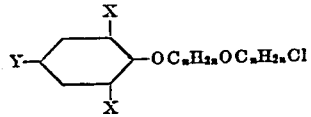

wherein one X represents a substituent from the group consisting of the phenyl radical, alkyl radicals containing from 1 to 8 carbon atoms, and chlorine; the other X represents a substituent from the group consisting of the aralkyl and tertiary alkyl radicals and chlorine; Y represents a member of the group consisting of the aralkyl radicals and hydrogen; and $n$ is one of the integers 2 and 3.

13. A composition of matter comprising an organo-soluble ethyl cellulose plasticized with from 10 to 40 parts, per 100 parts of ethyl cellulose, of a $\beta$-aryloxy, $\beta'$-chloro dialkyl ether having the general formula

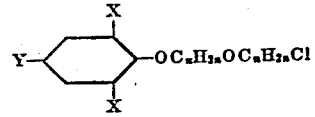

wherein one X represents a substituent from the group consisting of the phenyl radical, alkyl radicals containing from 1 to 8 carbon atoms, and chlorine; the other X represents a substituent from the group consisting of the aralkyl and tertiary alkyl radicals and chlorine; Y represents a member of the group consisting of the aralkyl radicals and hydrogen; and $n$ is one of the integers 2 and 3.

ARNOLD R. GABEL.
FRED LOWELL TAYLOR.